UNITED STATES PATENT OFFICE.

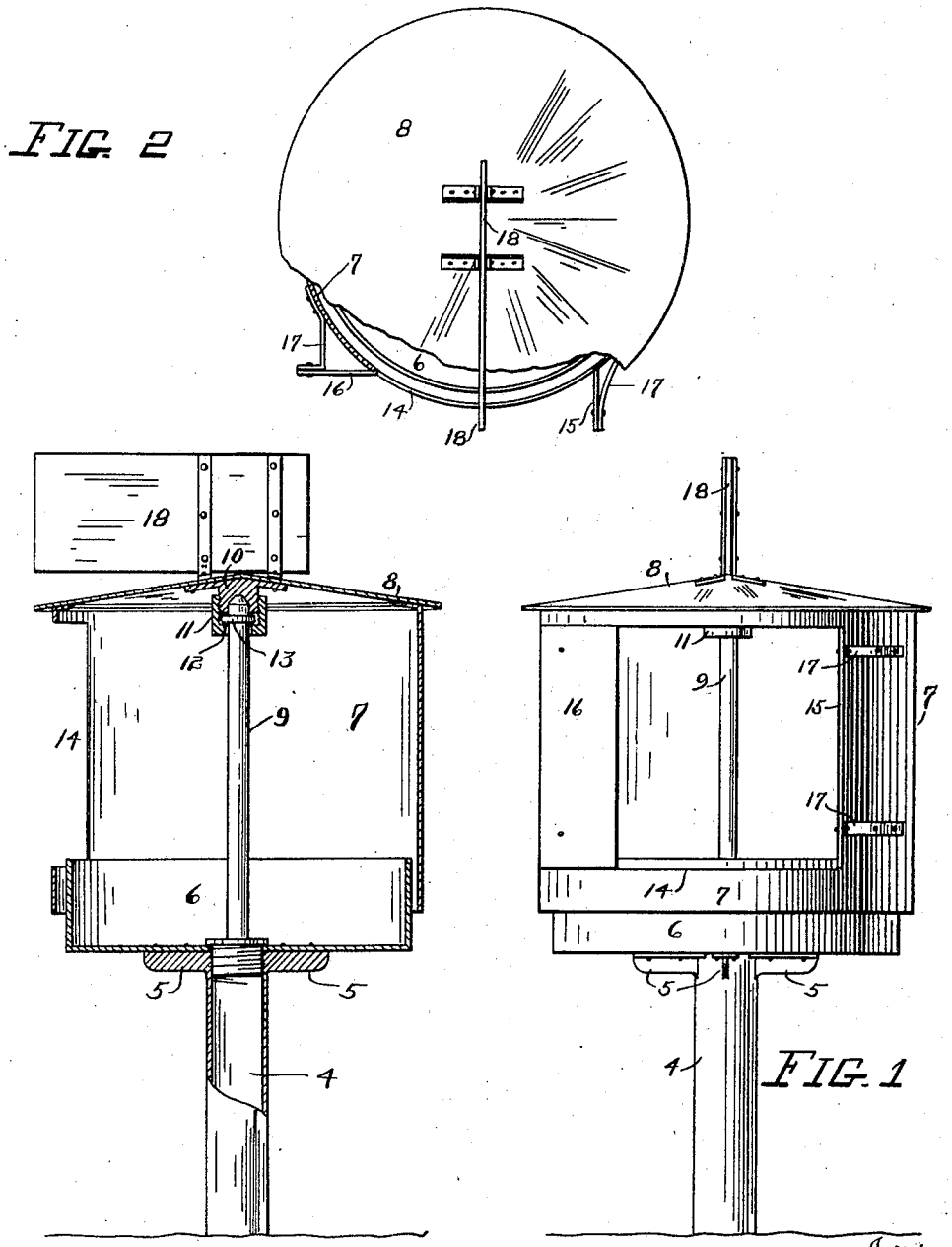

GEORGE PICOTTE, OF HOWARD TOWNSHIP, CHARLES MIX COUNTY, SOUTH DAKOTA.

STOCK-FEEDER.

1,333,775.  Specification of Letters Patent.  Patented Mar. 16, 1920.

Application filed September 16, 1916. Serial No. 120,440.

*To all whom it may concern:*

Be it known that I, GEORGE PICOTTE, a citizen of the United States, and a resident of Howard township, in the county of Charles Mix and State of South Dakota, have invented certain new and useful Improvements in Stock-Feeders, of which the following is a specification.

The present invention relates to stock-feeding devices.

The invention has for its primary object the production of a stock-feeder particularly adapted for feeding salt to stock in pastures and other unsheltered places, and adapted to keep the food dry and clean and yet readily accessible to the animals.

Another object of the invention is the production of a sheltered stock-feeder having a side opening through which the stock feed, and embodying certain novel features whereby the device is rotated and the opening is always on the leeward side, thereby preventing snow, rain and other matter from blowing onto the food.

A further object of the invention is the production of an improved stock-feeder for open air use, thoroughly efficient in operation and inexpensive in manufacture.

With these and other objects in view, the invention, consisting in the construction, combination and novel arrangement of parts, will be fully understood from the following description, reference being had to the accompanying drawings which form a part of this application and in which like characters of reference indicate corresponding parts throughout the several views, of which,—

Figure 1 is a front elevation of a stock-feeder constructed in accordance with the invention; Fig. 2 is a plan of the same, the upper portion being cut away, and Fig. 3 is a vertical section of the same taken at right-angles to Fig. 1.

Although I have illustrated and hereinafter described the preferred embodiment of the invention I would not be understood as being limited to the specific structure chosen for illustration, for various alterations and modifications may be made in the details of construction and arrangement of parts, without departing from the spirit and scope of the invention as defined in the appended claim.

Referring now, to the illustrations, 4, is a suitable support, preferably a post, or pipe, set in the ground.

The upper end of the pipe is formed with radial arms, 5, on which is secured a suitable food receptacle, 6, preferably cylindrical and mounted coaxially with the support.

The food receptacle is inclosed by a cylindrical casing 7, provided with a roof, 8, and rotatably supported by a shaft 9, rising from the support, 4, upon the upper end of the shaft being pivotally mounted a suitable bearing secured to the roof.

The bearing preferably consists of a cylinder, 10, secured to the roof and having a bore to receive the end of the shaft. Upon the bearing is threaded a sleeve, 11, having an internal flange, 12, which engages a boss, 13, on the shaft to prevent displacement of the shelter.

The front of the casing is provided with a rectangular opening, 14, through which the animals have access to the food receptacle.

At the sides of the said opening the casing is provided with wings, 15 and 16, the former of which extends forwardly from the casing and the latter of which is disposed at right angles to its companion. The wings are held rigidly by braces 17, secured to the casing and the wings.

Upon the roof is rigidly secured a weather-vane, 18, which points in the direction of the feed opening and thus serves to keep the opening from the wind.

When the casing is so disposed that the wind is toward or at an angle to the feed opening, it is evident that the wind will act on one of the wings to turn the casing until the other wing is brought within the influence of the wind, thereby causing the casing to turn until the opening is on the leeward side.

Obviously, the wings may be dispensed with if the vane, 18, is made relatively large enough to control the casing, but in the present embodiment, the vane is designed only to retain the shelter in position after it has been turned by the action of the wind on the wings, it having been found that a large vane is more or less obstructive and liable to damage, yet the wings cause no obstruction, and are very sensitive to a low wind.

Having thus described my invention, what I claim as new and desire to secure by Letters Patent, is,—

A stock-feeder comprising a post, a cylindrical food receptacle supported coaxially thereon, an upright shaft supported by and coaxially with the post and extended above the receptacle, and a cylindrical cover including a roof rotatably supported on the shaft, and walls depending below the upper edge of the receptacle to prevent lateral movement of the cover, and provided with a feed opening in the wall positioned above the receptacle.

In testimony, whereof, I have hereunto set my hand this 30th day of August, 1916.

GEORGE PICOTTE.